United States Patent
Cerceau

(10) Patent No.: US 12,404,469 B2
(45) Date of Patent: Sep. 2, 2025

(54) ARRANGEMENT FOR REGULATION OF A PLANT FOR THE MEMBRANE PERMEATION TREATMENT OF BIOGAS

(71) Applicant: L'Air Liquide, Societe Anonyme pour l'Etude et l'Exploitation des Procedes Georges Claude, Paris (FR)

(72) Inventor: Arnaud Cerceau, Sassenage (FR)

(73) Assignee: L'Air Liquide, Société Anonyme pour l'Etude et l'Exploitation des Procédés Georges Claude, Paris (FR)

( * ) Notice: Subject to any disclaimer, the term of this patent is extended or adjusted under 35 U.S.C. 154(b) by 921 days.

(21) Appl. No.: 17/469,484

(22) Filed: Sep. 8, 2021

(65) Prior Publication Data
US 2022/0073833 A1 Mar. 10, 2022

(30) Foreign Application Priority Data
Sep. 8, 2020 (FR) ...................................... 2009095

(51) Int. Cl.
| | |
|---|---|
| *B01D 53/22* | (2006.01) |
| *B01D 53/30* | (2006.01) |
| *C10L 3/10* | (2006.01) |

(52) U.S. Cl.
CPC ............. *C10L 3/104* (2013.01); *B01D 53/22* (2013.01); *B01D 53/30* (2013.01); *C10L 2200/0469* (2013.01); *C10L 2290/548* (2013.01)

(58) Field of Classification Search
CPC ............ B01D 53/22; B01D 53/30; C10L 3/10
See application file for complete search history.

(56) References Cited

U.S. PATENT DOCUMENTS

| | | | |
|---|---|---|---|
| 11,045,760 B2 | 6/2021 | Chareyre et al. | |
| 11,052,345 B2 | 7/2021 | Chareyre et al. | |
| 2007/0125537 A1 † | 6/2007 | Lokhandwala | |
| 2009/0156875 A1 * | 6/2009 | Tomioka | B01D 53/1487 96/5 |
| 2020/0188841 A1 | 6/2020 | Barraud et al. | |
| 2020/0261843 A1 | 8/2020 | Barraud et al. | |

FOREIGN PATENT DOCUMENTS

| | | |
|---|---|---|
| FR | 3 084 840 | 2/2020 |
| FR | 3 084 842 | 2/2020 |
| FR | 3 089 819 | 6/2020 |
| FR | 3 089 820 | 6/2020 |

OTHER PUBLICATIONS

French Search Report and Written Opinion for FR 2 009 095, mailed May 3, 2021.
Anonymous, Control of a 3-Stage Membrane System, pp. 1-3, Oct. 4, 2019, https://priorart.ip.com/IPCOM/000259979.†

\* cited by examiner
† cited by third party

*Primary Examiner* — Sharon Pregler
(74) *Attorney, Agent, or Firm* — Yan Jiang; Christopher J. Cronin

(57) ABSTRACT

Arrangement for regulation of a plant I for the membrane permeation treatment of a feed gas stream, comprising at least methane and carbon dioxide, that includes at least one means A for measurement of the gross calorific value (GCV) of the feed gas stream, at least one means B for comparison of the gross calorific value with a setpoint value E, at least one means C for production of a control signal as a function of the comparison of the gross calorific value with the setpoint value E, and at least one means D for transmission of this control signal to a means for regulation of said plant I.

4 Claims, 1 Drawing Sheet

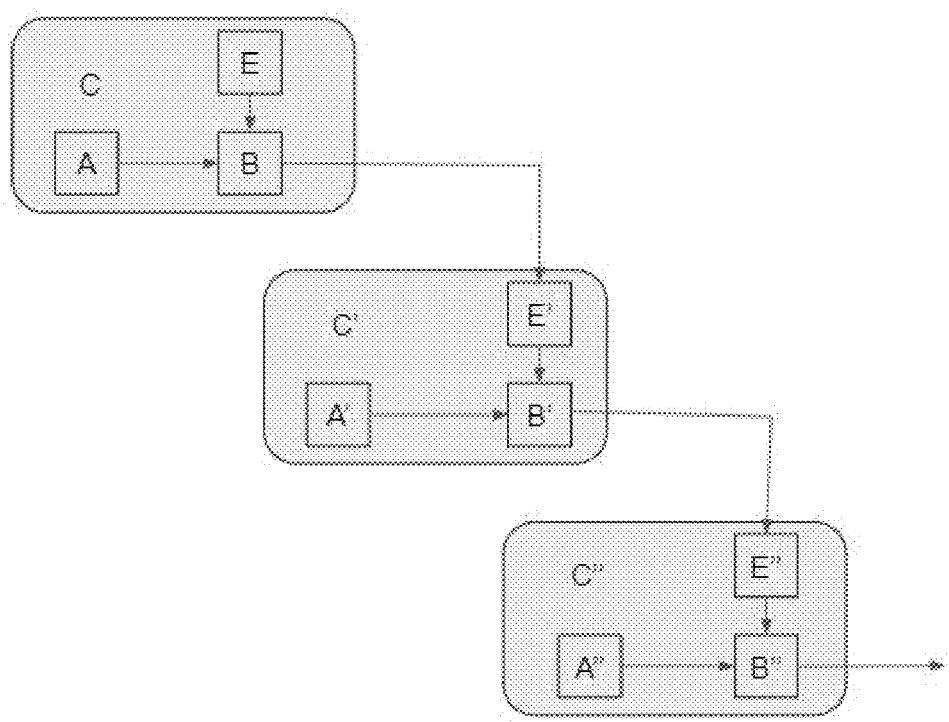

ARRANGEMENT FOR REGULATION OF A PLANT FOR THE MEMBRANE PERMEATION TREATMENT OF BIOGAS

CROSS-REFERENCE TO RELATED APPLICATIONS

This application claims the benefit of priority under 35 U.S.C. § 119 (a) and (b) to French patent application No. FR 2009095, filed Sep. 8, 2020, the entire contents of which are incorporated herein by reference.

BACKGROUND

Field of the Invention

The present invention relates to an arrangement for regulation of a plant I for the membrane permeation treatment of a feed gas stream comprising at least methane and carbon dioxide and to a regulation process employing such a plant.

The invention relates in particular to the purification of biogas, for the purpose of producing biomethane in accordance with the specifications for injection into a natural gas network.

Related Art

Biogas is the gas produced during the decomposition of organic matter in the absence of oxygen (anaerobic digestion), also known as methanization. This may be natural degradation—it is thus observed in marshland or in household waste landfills—but the production of biogas may also result from the methanization of waste in a dedicated reactor referred to as a methanizer or digester.

By virtue of its main constituents—methane and carbon dioxide—biogas is a powerful greenhouse gas; at the same time, it also constitutes a source of renewable energy which is appreciable in the context of the increasing scarcity of fossil fuels.

Biogas predominantly contains methane ($CH_4$) and carbon dioxide ($CO_2$) in proportions which can vary according to the way in which it is obtained, but also contains, in smaller proportions, water, nitrogen, hydrogen sulfide, oxygen, as well as other organic compounds, in trace amounts.

Depending on the organic matter which has been degraded and on the techniques used, the proportions of the components differ, but on average biogas comprises, on a dry gas basis, from 30% to 75% of methane, from 15% to 60% of $CO_2$, from 0% to 15% of nitrogen, from 0% to 5% of oxygen and trace compounds.

Biogas is enhanced in value in various ways. It can, after a gentle treatment, be enhanced in value close to the production site to supply heat, electricity or a mixture of both (cogeneration); the high carbon dioxide content reduces its calorific value, increases the costs of compression and of transportation and limits the economic advantage of enhancing it in value to this nearby use.

More intensive purification of biogas allows it to be more widely used; in particular, intensive purification of biogas makes it possible to obtain a biogas which has been purified to the specifications of natural gas and which can be substituted for the latter; biogas thus purified is known as "biomethane". Biomethane thus supplements natural gas resources with a renewable part produced within territories; it can be used for exactly the same uses as natural gas of fossil origin. It can feed a natural gas network or a vehicle filling station; it can also be liquefied to be stored in the form of liquefied natural gas (LNG), and the like.

The ways in which biomethane is enhanced in value are determined according to the local contexts: local energy requirements, possibilities of enhancement in value as biomethane fuel, existence nearby of natural gas distribution or transportation networks, in particular. By creating synergy between the various parties operating in a given territory (farmers, manufacturers, civic authorities), the production of biomethane assists the territories in acquiring greater energy autonomy.

Several stages need to be completed between collecting the biogas and obtaining the biomethane, the end product capable of being compressed or liquefied.

In particular, several stages are necessary before the treatment which is aimed at separating the carbon dioxide in order to produce a flow of purified methane.

A first stage consists in drying the biogas and stripping it of the corrosive components, which are hydrogen sulfide and volatile organic compounds (VOCs); the technologies used are, conventionally, pressure swing adsorption (PSA) and trapping on activated carbon. The biogas is subsequently compressed to a pressure of greater than 8 bar. Next comes the stage which consists in separating the carbon dioxide in order ultimately to have available methane at the purity required for its subsequent use.

Carbon dioxide is a contaminant typically present in natural gas, from which it is common to have to strip it. Varied technologies are used for this depending on the situation; among these, membrane technology is particularly effective when the $CO_2$ content is high; it is thus used to separate the $CO_2$ present in biogas and in particular in landfill gas.

Membrane gas separation processes used for the purification of a gas, whether they use one or more membrane stages, have to make it possible to produce a gas at the required quality, for a low cost, while minimizing the losses of the gas which it is desired to enhance in value. Thus, in the case of the purification of biogas, the separation carried out is mainly a $CH_4/CO_2$ separation which has to make possible the production of a gas containing, depending on its use, more than 85% of $CH_4$, preferably more than 95% of $CH_4$, more preferentially more than 97.5% of $CH_4$, while minimizing the $CH_4$ losses in the residual gas and the purification cost, the latter to a large extent being linked to the electricity consumption of the device for compression of the gas upstream of the membranes.

It is preferable for the natural gas network to receive a methane flow exhibiting a concentration of methane corresponding to a chosen setpoint.

Starting from that, one problem which is posed is that of providing an arrangement which makes it possible to obtain a methane flow at a concentration corresponding to a chosen setpoint.

SUMMARY OF THE INVENTION

A solution of the present invention is an arrangement for regulation of a plant I for the membrane permeation treatment of a feed gas stream comprising at least methane and carbon dioxide, said arrangement comprising:
- at least one means A for measurement of the gross calorific value (GCV) of the feed gas stream,
- at least one means B for comparison of the gross calorific value with a setpoint value E, at least one means C for production of a control signal as a function of the comparison of the gross calorific value with the target value, and at least one means D for transmission of this control signal to a means for regulation of said plant I.

The at least one means A for measurement of the gross calorific value (GCV) of the feed gas stream may be a methane analyser.

The setpoint value E corresponds to a value greater than or equal to the minimum GCV (gross calorific value) required by the administrator of the network into which the gas produced is injected.

It should be noted that the control signal expresses a new setpoint for concentration of $CO_2$ or of $CH_4$ in the biomethane stream at the outlet. This new concentration setpoint will be expressed by a regulation means, such as the pressure of at least one of the streams employed in the membrane permeation plant and/or the number of membranes employed in the membrane permeation plant.

While each of the means B and the means C may be separator processors, preferably they are combined in a single data processor.

According to a second alternative, a subject-matter of the invention is an arrangement for regulation of a plant I for the membrane permeation treatment of a feed gas stream comprising at least methane and carbon dioxide, said arrangement comprising:

at least one means A for measurement of the gross calorific value (GCV) of the feed gas stream, at least one means B for comparison of the gross calorific value with a first setpoint value E, at least one means C for production of a first control signal for the concentration of methane or of carbon dioxide at the outlet of the plant I as a function of the comparison of the gross calorific value with the first setpoint value E, at least one means D for transmission of the first control signal to a setpoint for concentration of methane or of carbon dioxide at the outlet of the plant in the form of a second setpoint value E', at least one means A' for measurement of the concentration of methane or of carbon dioxide at the outlet of the plant I, at least one means B' for comparison of the concentration of methane or of carbon dioxide at the outlet of the plant I with the second setpoint value E', at least one means C' for production of a second control signal as a function of the comparison of the concentration of methane or of carbon dioxide at the outlet of the plant I with the second setpoint value E', at least one means D' for transmission of this second control signal to a means for regulation of said plant I.

It should be noted that the transmission means D' can alternatively transmit this second control signal to a setpoint for concentration of methane or of carbon dioxide at the outlet of the plant in the form of a third setpoint value E", as is represented diagrammatically in FIG. 1. In this case, there will then be found, in the arrangement according to the invention:

at least one means A" for measurement of the concentration of methane or of carbon dioxide at the outlet of the plant I, at least one means B" for comparison of the concentration of methane or of carbon dioxide at the outlet of the plant I with the third setpoint value E", at least one means C" for production of a third control signal as a function of the comparison of the concentration of methane or of carbon dioxide at the outlet of the plant I with the third setpoint value E", at least one means D" for transmission of this third control signal to a means for regulation of said plant I.

Preferably, the means B and the means C are combined in a first processor and/or the means B' and the means C' are combined in a second processor and/or the means B" and the means C" are combined in a third processor. As the case may be, the arrangement according to the invention can exhibit one or more of the following characteristics:

the regulation means comprises a system of valves making it possible to add at least one membrane to or to remove at least one membrane from the plant, the regulation means comprises at least one compressor/backpressure valve assembly making it possible to increase or to reduce the pressure of at least one of the streams employed in the plant, the plant comprises at least two membrane separation units.

Another subject-matter of the present invention is a process for regulation of a plant I for the membrane permeation treatment of a feed gas stream comprising at least methane and carbon dioxide, said process employing an arrangement as defined above, and comprising:

a) a stage of measurement of the gross calorific value (GCV) of the feed gas stream, b) a stage of comparison of the gross calorific value with a setpoint value E, c) a stage of production of a control signal as a function of the comparison carried out in stage b), d) a stage of transmission of this control signal to a means for regulation of said plant I, and e) a stage of regulation of the plant I as a function of the control signal transmitted in stage d).

According to a second alternative, a subject-matter of the present invention is a process for regulation of a plant I for the membrane permeation treatment of a feed gas stream comprising at least methane and carbon dioxide, said process employing an arrangement as defined above, and comprising:

a) a stage of measurement of the gross calorific value (GCV) of the feed gas stream, b) a stage of comparison of the gross calorific value with a setpoint value E, c) a stage of production of a first control signal for the concentration of methane or of carbon dioxide at the outlet of the plant I as a function of the comparison carried out in stage b), d) a stage of transmission of the first control signal to a setpoint for concentration of methane or of carbon dioxide at the outlet of the plant in the form of a second setpoint value E', e) a stage of measurement of the concentration of methane or of carbon dioxide at the outlet of the plant I, f) a stage of comparison of the concentration of methane or of carbon dioxide at the outlet of the plant I with the second setpoint value E', g) a stage of production of a second control signal as a function of the comparison of the concentration of methane or of carbon dioxide at the outlet of the plant I with the second setpoint value E', h) a stage of transmission of this second control signal to a means for regulation of said plant I, and i) a stage of regulation of the plant I as a function of the control signal transmitted in stage h).

Finally, the process according to the invention can exhibit one or more of the characteristics below:

the regulation stage comprises a stage of adjustment of the number of membranes in the plant, the regulation stage comprises a stage of increase or of decrease in the pressure of at least one of the streams employed in the plant, the feed gas stream is biogas.

BRIEF DESCRIPTION OF THE FIGURES

FIG. 1 is a flow diagram for an embodiment of the process of the invention.

DETAILED DESCRIPTION OF THE INVENTION

The plant can comprise a first membrane separation unit capable of receiving the feed gas stream and of providing a first permeate and a first retentate and a second membrane separation unit capable of receiving the first retentate and of providing a second permeate and a second retentate. In this case, the regulation can, for example, be carried out by an increase or a decrease in the pressure of the feed gas stream and/or of the second permeate. Preferentially, the plant also comprises a third membrane separation unit capable of receiving the first permeate and of producing a third retentate and a third permeate. The plant can optionally comprise a fourth membrane separation unit capable of receiving the third retentate and of producing a fourth retentate and a fourth permeate. It should be noted that the retentates will be enriched in methane and the permeates enriched in carbon dioxide.

Consequently, in the context of the invention, the term "gas stream employed in the plant" is understood to mean the feed gas stream but also the various permeates and retentates.

The system of valves making it possible to add at least one membrane to or to remove at least one membrane from the plant makes it possible to add at least one membrane to or to remove at least one membrane from at least one of the membrane separation units of the plant.

The valves making it possible to add and to remove the membranes of a membrane separation unit are preferably butterfly valves or ball valves.

The solution according to the invention makes it possible to obtain a stream of methane at the chosen concentration (second retentate).

This is because to choose a specific content of $CO_2$ does not guarantee a precise content of $CH_4$ because other components may be present in the biomethane, such as nitrogen ($N_2$) or oxygen ($O_2$). These other components will degrade the calorific value of the biomethane.

The arrangement according to the invention makes it possible to correct these errors. This is because the gross calorific value takes into account all the constituents of the feed gas stream. Consequently, by basing itself on the latter, the solution according to the invention gives more precise regulation of the membrane plant. The further away the gross calorific value of the feed gas stream is from the gross calorific value of biomethane, the greater the filtration in the membrane permeation plant. And, conversely, the closer the gross calorific value of the feed gas stream is to the gross calorific value of biomethane, the lower the filtration in the membrane permeation plant.

While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims. The present invention may suitably comprise, consist or consist essentially of the elements disclosed and may be practiced in the absence of an element not disclosed. Furthermore, if there is language referring to order, such as first and second, it should be understood in an exemplary sense and not in a limiting sense. For example, it can be recognized by those skilled in the art that certain steps can be combined into a single step.

The singular forms "a", "an" and "the" include plural referents, unless the context clearly dictates otherwise.

"Comprising" in a claim is an open transitional term which means the subsequently identified claim elements are a nonexclusive listing i.e. anything else may be additionally included and remain within the scope of "comprising." "Comprising" is defined herein as necessarily encompassing the more limited transitional terms "consisting essentially of" and "consisting of"; "comprising" may therefore be replaced by "consisting essentially of" or "consisting of" and remain within the expressly defined scope of "comprising".

"Providing" in a claim is defined to mean furnishing, supplying, making available, or preparing something. The step may be performed by any actor in the absence of express language in the claim to the contrary.

Optional or optionally means that the subsequently described event or circumstances may or may not occur. The description includes instances where the event or circumstance occurs and instances where it does not occur.

Ranges may be expressed herein as from about one particular value, and/or to about another particular value. When such a range is expressed, it is to be understood that another embodiment is from the one particular value and/or to the other particular value, along with all combinations within said range.

All references identified herein are each hereby incorporated by reference into this application in their entireties, as well as for the specific information for which each is cited.

The invention claimed is:

1. An arrangement for regulation of a plant I for the membrane permeation treatment of a feed gas stream comprising at least methane and carbon dioxide, said arrangement comprising:

at least one means A for measurement of the gross calorific value (GCV) of the feed gas stream;

at least one means B for comparison of the gross calorific value with a setpoint value E;

at least one means C for production of a control signal as a function of the comparison of the gross calorific value with the setpoint value E; and at least one means D for transmission of this control signal, wherein the means D is capable of transmitting the control signal to a means for regulation of said plant I or to a setpoint for concentration of methane or of carbon dioxide at the outlet of the plant in the form of a second setpoint value E', wherein the regulation means comprises at least one compressor/backpressure valve assembly making the arrangement possible to increase or to reduce the pressure of at least one of the streams employed in the plant I, wherein the plant I comprises at least two membrane separations, wherein the regulation means comprises a system of valves making the arrangement possible to add at least one membrane to or to remove at least one membrane from the plant I or from at least one of the at least two membrane separations of the plant I.

2. The arrangement of claim 1, wherein the means B and the means C are combined in a processor.

3. The arrangement of claim 1, wherein the means D for transmission of this control signal is capable of transmitting the control signal to a setpoint for concentration of methane or of carbon dioxide at the outlet of the plant in the form of a second setpoint value E' and said arrangement comprises:
- at least one means A' for measurement of the concentration of methane or of carbon dioxide at the outlet of the plant I,
- at least one means B' for comparison of the concentration of methane or of carbon dioxide at the outlet of the plant I with the second setpoint value E',
- at least one means C' for production of a second control signal as a function of the comparison of the concentration of methane or of carbon dioxide at the outlet of the plant I with the second setpoint value E',
- at least one means D' for transmission of this second control signal to a means for regulation of said plant I.

4. The arrangement of claim 3, wherein the means B and the means C are combined in a first processor and/or the means B' and the means C' are combined in a second processor.

* * * * *